Figure 1:
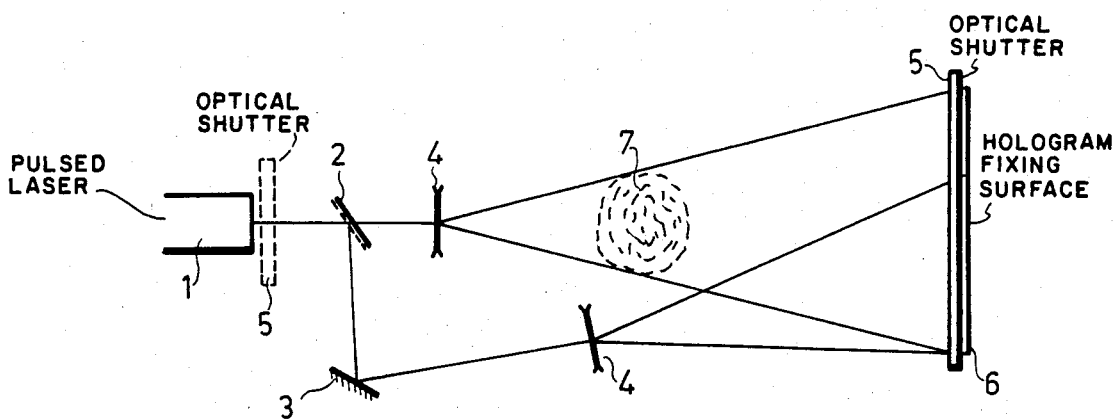

United States Patent [19]

Timkó born Józsa et al.

[11] 4,278,319
[45] Jul. 14, 1981

[54] PROCESS AND APPARATUS FOR THE DETERMINATION OF THE PHYSICAL CHARACTERISTICS OF DISPERSED SYSTEMS BY HOLOGRAPHY

[75] Inventors: Judit Timkó born Józsa; Tibor Blickle; Oszkár Borlai, all of Budapest; Aurél Ujhidy, Veszprem, all of Hungary

[73] Assignee: Magyar Tudomanyos Akademia Muszakikemiai Kutato Intezete, Hungary

[21] Appl. No.: 12,112

[22] Filed: Feb. 14, 1979

[51] Int. Cl.³ .............................. G03H 1/30
[52] U.S. Cl. .................................. 350/3.78
[58] Field of Search ............. 350/162 SF, 3.78, 3.79, 350/3.67, 3.81, 3.75, 3.77

[56] References Cited
U.S. PATENT DOCUMENTS

| | | | |
|---|---|---|---|
| 3,520,610 | 7/1970 | Parrent, Jr. et al. | 350/162 SF |
| 3,785,712 | 1/1974 | Hannan | 350/379 |
| 3,838,903 | 10/1974 | Leith et al. | 350/3.79 X |

*Primary Examiner*—John K. Corbin
*Assistant Examiner*—Bruce Y. Arnold

[57] ABSTRACT

An improved method for examining an at least partially transparent dispersed system which is trans-illuminated by a laser beam directed to a surface region of a photosensitive recording means is disclosed. The improvement is characterized by the steps of: producing a reference laser beam from the trans-illuminating laser beam before it passes through the dispersed system; directing the reference laser beam directly to a first portion of the surface region; optically recording the resulting interference pattern on the surface region, whereby the surface region comprises an off-line holographic record of the dispersed system in a first portion in which both the through-going and the reference laser beams are recorded and an in-line holographic record of the dispersed system in a second portion; and, reconstructing the in-line and off-line holographic records on disjunct fields of the region to provide appropriate, separately evaluable images of the dispersed system.

1 Claim, 3 Drawing Figures

PROCESS AND APPARATUS FOR THE DETERMINATION OF THE PHYSICAL CHARACTERISTICS OF DISPERSED SYSTEMS BY HOLOGRAPHY

The invention concerns a process and apparatus for the determination of the physical characteristics of dispersed systems by holography, by means of illuminating the dispersed system by a laser beam, fixing the optical information on a hologram, reviving or reconstituting the three dimensional image of the dispersed system from the hologram by means of a laser beam, preparing two dimensional photographs from the image and evaluating the photographs in a known manner.

The apparatus according to the invention for carrying out the process includes a hologram preparing unit and an image reconstituting unit.

The process and the apparatus serve for the determination of the physical characteristics, such as the size, size distribution, shape, velocity of movement and distribution of the velocity of movement etc. of the dispersed parts of the dispersed system.

By "dispersed system" is meant one or more finely distributed phase(s) in another phase. Thus a dispersed system may consist of a gas phase containing a finely distributed solid phase or a liquid phase or both of them together, or a liquid phase containing finely distributed gas and/or solid phases, or in the case of an optically transparent solid phase, gaseous and/or liquid enclosures in the solid phase may also be regarded as a "dispersed system."

Processes are already known for the laboratory examination of dispersed systems making use of holography. In these known processes, either the whole of the dispersed system of a selected volume thereof is illuminated with a coherent and monochromatic beam, e.g. a laser beam, and by virtue of the interference between the waves reflected from the various points of the surfaces of the dispersed parts and the original laser beam, the so-called reference beam, an interference pattern is created on a hologram fixing surface. If this surface is a photo-sensitive surface, e.g. a photo-emulsion, then the interference diagram gives rise to a hologram. When the hologram is illuminated with a laser beam, the real and virtual, three-dimensional image of the dispersed system can be revived or reconstituted from which one can obtain by various optical methods and devices an enlarged two-dimensional picture of the dispersed system or a series of such pictures from the different planes of the dispersed system, which can thereafter be evaluated in a manner known per se to determine the above enumerated physical characteristics. The optical means may for instance include a closed circuit television system and a photographic camera coupled thereto or a photographic camera coupled to a microscope.

When the reference beam necessary for the preparation of a hologram passes through the dispersed system, the method of preparing the hologram is known as an "in-line" hologram, while in the case where the reference beam is deflected from a straight line path by optical means such as mirrors and does not pass through the dispersed system, the resulting hologram is known as a "deflected reference beam" hologram.

The choice between these two methods of preparing a hologram for examination of dispersed systems depends on the density, reflective power etc. of the dispersed parts.

The preparation of the "in-line" holograms is simpler. In general the "deflected reference beam" method is used only when the in-line method does not lead to a satisfactory result. However, the subsequent exposure by the second method no longer reflects the exact condition of the system examined in the first attempt.

Holographic methods are known for examining both powders and liquid drops. A common drawback of these methods is that one cannot choose in advance between the "in-line" and "deflected reference beam" method of preparing the hologram, and furthermore that it is not possible to distinguish the powder particles, the liquid droplets and bubbles from each other. Furthermore, there is no known holographic method for the simultaneous examination of multiphase dispersions which can distinguish the different phases in the dispersion.

The known methods for preparing holograms can only be used in special laboratories which can be completely darkened. Extraneous light must not reach the photosensitive layer. The cross-section of the test space must agree with the cross-section of the illuminating beam and therefore the latter is widened by suitable optical elements e.g. collimators. However, the beam area widening capacity of collimators is limited and thus the maximum cross-section that can be examined is less than 1 $dm^2$.

For the above-listed reasons, holographic methods are only suitable for the examination in laboratories of dispersions located in spaces of laboratory size. These processes are rendered slow and cumbersome by the fact that on reconstitution of the image of the dispersed system, the optical apparatus which gives the enlargement such as a closed circuit television system or a microscope can only be adjusted slowly and with some difficulty.

The thus obtained two-dimensional picture is the same whether prepared by means of the "in-line" or the "deflected reference beam" method and becomes difficult or impossible to evaluate, especially in the case of fine dispersions, because of the speckling on the television screen due to the background noise of the laser beam.

An aim of the invention is the provision of a process and apparatus which reduces or eliminates the above-mentioned drawbacks and which enables three phase dispersions to be examined and which enables industrial scale examinations or tests to be carried out.

The process and apparatus according to the invention are based on the discovery that one can make simultaneously and in a juxtaposed manner, a double hologram from the dispersed system under test by optically splitting the illuminating laser beam. In the course of reconstituting the holograms of the dispersed system the background noise of the laser can be eliminated from the resulting image in a closed circuit television system by reducing the intensity of the electron beam. Surprisingly, the dispersed parts belonging to the different phases are distinguishable on the thus resulting image or images and the photograph that can be made from the screen of the television is of such high quality that automated and mechanised evaluation becomes possible.

The process and apparatus according to the invention is furthermore based on the discovery that if the photosensitive plate serving to fix the hologram is provided with a photographic shutter synchronised with the pulses of a pulsed laser, and the plate is then exposed for only very short times to the illuminating laser beam and simultaneously to the effect of extraneous light, then a surprising result is that the very short duration effect of the extraneous light does not prevent high quality holograms from being obtained. This enables the preparation of holograms in apparatus of industrial size and without the use of darkrooms, i.e. outside laboratories, and in this way it becomes possible to examine in situ the dispersed systems which arise in industrial processes and operations, especially in the chemical and allied industries.

According to one aspect of the invention there is provided a process for the holographic examination of optically at least partially transparent dispersed systems comprising the steps of illuminating the examined dispersed system by means of a laser beam, directing said illuminating laser beam after it has passed through said system to a predetermined surface region of photosensitive recording means, producing a reference laser beam from the illuminating laser beam before it passes through said dispersed system directing said reference laser beam directly to a part only of said surface region of said recording means, optically recording the resulting interference pattern on said surface region, and reconstructing said recorded interference pattern to provide an image of said dispersed system.

According to another aspect of the invention, there is provided apparatus for the holographic examination of optically at least partially transparent dispersed systems comprising a laser source, a beam splitting optical element arranged across the beam path of said laser source for producing two separately directed laser beams, viz, an illuminating laser beam and a reference laser beam, respectively, an optical at least partially transparent dispersed system arranged in the path of said illuminating laser beam, a photosensitive recording means placed in the path of said region illuminated by said illuminating laser beam after passing through said dispersed system, and an optical beam guiding means for directing said reference laser beam to a sub-region only of said region of said recording means.

The laser beam source of the apparatus according to the invention may be a gas laser, a pulsed laser or a chemical laser etc. In a preferred embodiment of the apparatus according to the invention the light source of the hologram preparing unit is a pulsed laser.

Preferably, in the course of image reconstitution or reconstruction, a displaceable screen is placed in front of or in place of the sensing portion of the camera of a closed circuit television system and the image is focussed on this screen. In this way, on the one hand the sensing portion is prevented from burning by the intensive laser beam passing through a possibly faulty part of the hologram and on the other hand the focussing of the image is rendered easier, faster and more accurate and then by displacing the screen or by setting the sensing portion of the camera in place of the screen, the focussed image can be viewed enlarged on the television screen.

The two-dimensional photograph or photograph series obtained in the course of image reconstruction can be evaluated by manual methods but since in a preferred process according to the invention the image has been freed from background noise due to the laser beam, expediently evaluation can take place by a known automatic machine, such as e.g. the "Classimat" apparatus manufactured by the well-known company Leitz.

In the course of preparing holograms, the arrangements seek to ensure that the path length of the reference beam should be approximately the same as the path length of the beam passing through the object on the test. Consequently, the method of preparing a hologram embodied in the invention which combines the "in-line" and the "deflected" reference beams, the arrangement is preferably such that after splitting the illuminating laser beam the path length of the "in-line" beam to the photosensitive plate is rendered equal to the path length of the deflected reference beam by the interposition of a pair of deflecting mirrors.

According to another advantageous embodiment of the apparatus and process according to the invention, after splitting the beam, the diameter of each of the two beams is spread to the diameter of the space to be examined or tested.

It may occasionally be desirable in the course of preparing a hologram to take a series of exposures; the time interval between the individual exposures can be reduced in a preferred process according to the invention by replacing the photosensitive plate with a fresh plate during the charging time of the illuminating pulsed laser.

In the course of image reconstruction, a hologram which is used out of the two is that which is exposed to the reconstructing laser beam. Hence in a preferred embodiment of the process according to the invention, for image reconstruction only one or other of the two holograms is illuminated and in a preferred embodiment of the apparatus according to the invention the hologram holder of the image reconstructing unit has a device for blocking one half of the double hologram from being exposed to the laser beam.

In the course of preparing and reconstituting the hologram, it is necessary to enlarge the diameter of the beam emitted by the source. This is generally done by the use of collimators. In the apparatus according to the invention, however, bearing in mind the aim of performing tests on an industrial scale, in a preferred embodiment the optical element for enlarging the beam diameter is a diffusing lens.

In another preferred embodiment of the apparatus according to the invention, the hologram preparing unit has a guiding and deflecting mirror pair for performing the "in-line" method of illumination.

An advantage of the process according to the invention is that for its performance it does not require a separate dark-room. This is achieved by providing that the photosensitive element is exposed to extraneous light additional to that serving to illuminate the object for only the shortest possible time. In an advantageous embodiment of the apparatus according to the invention, for carrying out the process set forth above, there is a synchronising unit for synchronising the pulsing of the laser and the opening of the optical shutter in the hologram preparing unit.

In a further preferred embodiment of the apparatus according to the invention, for performing the "in-line" mode of illumination the hologram preparing unit is provided with a lens or lens system which projects or diffuses the beam to the whole of the surface area of the hologram fixing surface and for carrying out the mode of illumination with a "deflected" reference beam, it has a lens or lens system adapted to project or diffuse the beam to a portion, preferably one half of the hologram fixing surface.

In a preferred embodiment of the apparatus according to the invention the light source of the image reconstituting unit is a gas laser.

In a further advantageous embodiment of the apparatus according to the invention, the camera of the closed circuit television system has no lens.

Figure 2:
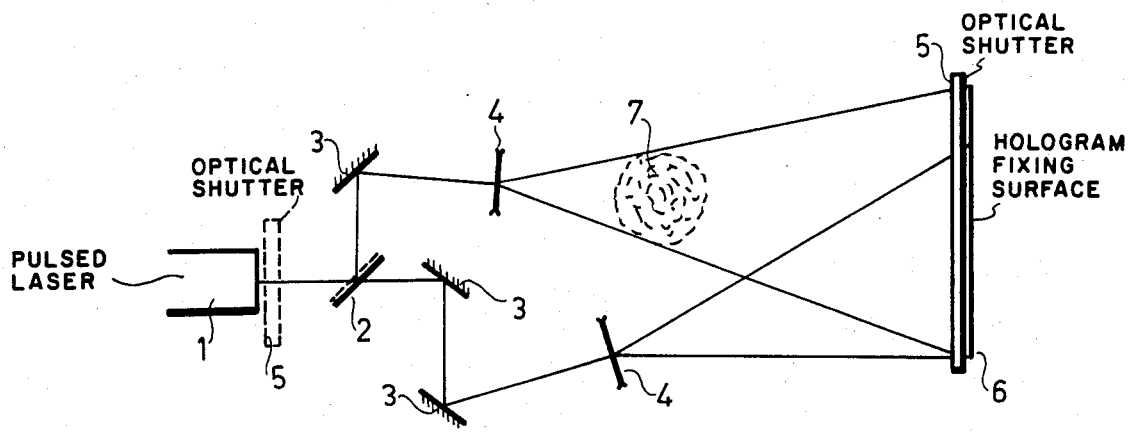
Figure 3:
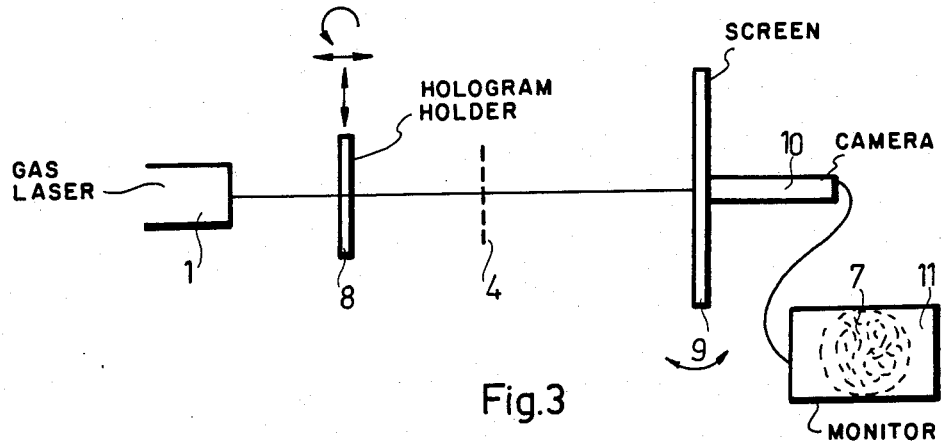

The invention is described merely by way of example with reference to the accompanying schematic drawings, wherein:

FIGS. 1 and 2 are alternative preferred embodiments of a hologram preparing unit forming part of the apparatus according to the invention, and FIG. 3 is a schematic view of an image reconstituting unit forming a part of the apparatus according to the invention.

Referring first to FIG. 1, illustrating a preferred embodiment of apparatus according to the invention, the hologram preparing unit includes as a source of coherent radiation a pulsed laser 1. The beam it emits is split into two by a beam splitting mirror 2. One beam passes through undeflected and is referred to as the "in-line" beam. The other beam is referred to as the "deflected reference beam" which is deflected by 90° by the beam splitting mirror 2 and is projected to a guiding mirror 3 which directs the beam towards a photosensitive plate 6 for fixing the hologram. As regards the "deflected" reference beam, the beam splitting and guiding mirrors 2 and 3 can be regarded as a directing mirror pair.

Both beams pass through a respective diffusing lens 4 for widening out or enlarging the diameter of the respective beam. The diffusing lens 4 in the path of the "in-line" beam widens the diameter of the latter sufficiently completely to ensure that the beam should spread to the whole cross-section of the space 7 containing the dispersed system it is desired to examine. Thereafter, the "in-line" beam reaches and spreads over the whole surface of the hologram fixing surface 6. The diffusing lens 4 in the path of the "deflected" reference beam spreads the diameter of that beam so that it only reaches a portion, preferably one half, of the hologram fixing surface 6. An optical shutter 5 placed in front of the hologram fixing surface 6 can selectively allow or prevent the beams from reaching the surface. In addition, there is an optional and non-illustrated mechanism included in the hologram preparing unit which serves to displace or replace the hologram fixing surface 6 and which can be used to replace an exposed plate 6 with a new plate while the pulsed laser 1 is being charged up again.

In a second embodiment of the hologram preparing unit of the apparatus according to the invention, as illustrated in FIG. 2, again a pulsed laser 1 serves as the light source. Again, the beam is split into two by a beam splitter 2 but in this embodiment it is the "in-line" beam which is deflected by 90°, directed at a guiding mirror 3 and passed via a diffusing lens 4 at the dispersed system 7. The "deflected" reference beam passes straight through the beam-splitting mirror 2 via a pair of guiding and deflecting mirrors 3 to the diffusing lens 4, and from there towards the plate 6. In other respects, this embodiment is identical with that of FIG. 1.

In both of the above described embodiments, of the hologram preparing unit, it is possible to interpose an optical shutter 5 indicated in broken lines before the beam splitting mirror 2, i.e. directly on exit from the laser unit.

Referring now to FIG. 3 which illustrates the image reconstituting unit forming part of the apparatus according to the invention, the source of coherent radiation is a gas laser 1. The double hologram is arranged on a hologram holder 8 which can be displaced in all directions, that is, forwardly or backwardly, laterally and angularly displaceable over any angle about a vertical axis as shown by the arrows. The holder can be fixed in any desired position after such displacement. The laser beam from the source 1 is arranged to fall on one half of the double hologram in the holder. A non-illustrated displaceable cover plate covers the other half of the double hologram from the laser beam. The laser beam passing through one half of the double hologram passes through a diffusing lens 4 which can be placed in its path and which is shown in the drawing by broken lines, thereby producing an image of the original dispersed system on a screen 9 displaceable along the double headed arrow shown in the Figure.

By suitably and co-ordinatedly displacing the hologram holder 8, the diffusing lens 4 and/or the screen 9 the image can be rendered sharp, i.e. focussed. After focussing the displaceable screen can be removed from in front of the camera of a closed-circuit television system and thereafter the sensing plane of the camera 10 can be moved forwardly and accurately into the plane of the screen 9, or when the camera and the screen are coupled together, the sensing plane of the camera is advanced into the original position of the screen 9.

In the described embodiment the camera 10 is expediently used after removal of its lens system. The image in the camera can be viewed on a monitor or display device 11 which has a non-illustrated device for varying the intensity of the electron beam whereby the intensity of the electron beam can be reduced (the desired grey value can be set) and thereby the background noise due to the laser beam can be eliminated from the image seen on the monitor/display device 11. The thus obtained high quality picture can be photographed by a non-illustrated photographic device and the photograph or photographs can be evaluated by an equally non-illustrated opto-electronic analyser.

The use of the process and apparatus according to the invention is further explained by way of Examples.

EXAMPLE 1

A pulsed laser is used for examining and exposing a liquid droplet dispersion formed on an industrial atomising disc. The atomising disc may operate at a peripheral velocity of e.g. 100 m/sec. and water or an aqueous solution of carboxy-methyl-cellulose is passed by gravitation to the disc and the dispersed droplets are examined in the region immediately adjacent to the edge of the disc as the droplets are thrown off the disc. The pulsed laser provides flashes of lights with a duration of 20 nanoseconds with an energy of 5–10 MW. This is sufficient for illuminating and passing through the dense droplet dispersion. The droplets thrown off the edge of the atomising disc are illuminated from below and the film for fixing the hologram is placed above the atomising disc. For this purpose, Agfa-Gevaert Scientia 10E75 film is used. After the beam splitter the pulsed beam of the laser is spread by two diffusing lenses of −6.9 diopter's power to a diameter of 30 cm.

After developing the thus-formed double hologram, first one half thereof and then the other half is illuminated by a He-Ne gas laser of 5 mW to examine the thus formed droplet dispersion on the monitoring/displaying device of the closed circuit television system. By displacing the hologram in space by means of a table provided with a micrometric displacement mechanism, different planes of the three-dimensional image of the drops can be focussed. By photographing these images, they can be evaluated by an opto-electronic analyser such as a "Classimat" made by the Leitz company.

The analyser registers the size (diameter) of the drops, their size distribution, projected surface area and the area distribution. In the case of the larger droplets, the "in-line" method of illumination is better suited for use in evaluation while in the case of smaller droplets the "deflected reference beam" manner of illumination is more expedient.

With the method described in the Example, the formation of the droplets can be fixed in three dimensions without disturbing the phenomenon, and in the course of examining Newtonian and non-Newtonian liquids it can be ascertained that the droplets did not form in an identical manner.

EXAMPLE 2

In circumstances identical with those described above in Example 1, the droplet formation was examined in a space containing smoke consisting of powder of fine distribution. After preparing the double hologram, and the taking of photographs, in the manner described above in Example 1, the evaluation was performed by a manual method. The droplets formed could be evaluated by an exposure prepared by the "in-line" mode of illumination while the powder particles suspended in the space under test could be evaluated by exposures taken by the "deflected" reference beam method of illumination.

EXAMPLE 3

A double hologram was prepared of smoke (dilute dispersion) passing in a tube towards a chimney or flue at a portion of the tube made of transparent material, so that the film was illuminated by two consecutive laser pulses. In the photographs prepared according to this process, the dispersed particles showed up in double because of the double illumination or exposure. The path length (the mutual distance of the doubled particles) computed after enlargement and the time difference between the two exposing pulses allow a computation of the velocity of movement of the particles of different sizes in the smoke.

The above examples served to elucidate and further explain the manner of using the process and apparatus according to the invention but the application of the invention both as to its precise manner and area is not so limited and is extremely versatile.

The process and apparatus according to the invention enables the production of a double hologram but it does not exclude the possibility of preparing a hologram by using only one or other modes of exposure or illumination; by using the other advantages of the process one can still obtain pictures using the known procedures which are of higher quality and which are suitable for producing pictures that are good enough to determine physical characteristics of the dispersed system.

An advantage of the process and apparatus according to the invention is that one can produce pictures of dispersed systems which retain all the known advantages of holography and its known drawbacks are eliminated or reduced making it possible to determine the physical characteristics of the dispersion by an automatic analysing apparatus and the dispersed phases can be distinguished from each other.

The process and apparatus according to the invention enable holographic methods to be used on an industrial scale.

The process and apparatus according to the invention are suitable for the determination of the physical characteristics of powders, droplets and bubbles separately as well as together.

In this way, the process and the apparatus are expediently usable in industrial production especially in the chemical, food and cosmetics industries, and allied industries, in the examination of products especially all kinds of sprays, in the energy producing industries and in environmental protection etc.

What is claimed is:

1. In an in-line holographic method for the examination optically of at least partially transparent dispersed systems, in which a dispersed system is trans-illuminated by a laser beam and the through-going laser beam is directed to a surface region of a photosensitive recording means, the improvement being characterized by the steps of producing a reference laser beam from the trans-illuminating laser beam before it passes through said dispersed system, directing said reference laser beam directly to a portion of said surface region, optically recording the resulting interference pattern on said surface region, whereby said surface region comprises an off-line holographic record of said dispersed system in said portion in which both the through-going and the reference laser beams are recorded and an in-line holographic record of said dispersed system in the parts of said region other than said portion; and reconstructing said in-line and said off-line holographic records on disjunct fields of said region to provide appropriate, separately evaluable images of said dispersed system.

* * * * *

UNITED STATES PATENT AND TRADEMARK OFFICE
CERTIFICATE OF CORRECTION

PATENT NO. : 4,278,319
DATED : July 14, 1981
INVENTOR(S) : Mrs. Timko born Judit Jozsa and Dr. Tibor Blickle It is certified that error appears in the above-identified patent and that said Letters Patent are hereby corrected as shown below:

[73] Assignee: Magyar Tudomanyos Akademia
Muszaki Kemiai Kutato Intezete
Hungary

*Signed and Sealed this*

*Second* Day of *February 1982*

[SEAL]

*Attest:*

GERALD J. MOSSINGHOFF

*Attesting Officer*     *Commissioner of Patents and Trademarks*